Oct. 27, 1953      T. BARDEEN      2,657,374
SUSPENSION SYSTEM FOR SEISMOGRAPH DETECTORS
Filed Nov. 2, 1949      3 Sheets-Sheet 1

INVENTOR.
THOMAS BARDEEN
BY
ATTORNEY

Oct. 27, 1953     T. BARDEEN     2,657,374
SUSPENSION SYSTEM FOR SEISMOGRAPH DETECTORS
Filed Nov. 2, 1949     3 Sheets-Sheet 2

INVENTOR.
THOMAS BARDEEN
BY
ATTORNEY

Oct. 27, 1953  T. BARDEEN  2,657,374
SUSPENSION SYSTEM FOR SEISMOGRAPH DETECTORS
Filed Nov. 2, 1949  3 Sheets-Sheet 3

INVENTOR.
THOMAS BARDEEN
BY
G. M. Houghton
ATTORNEY

Patented Oct. 27, 1953

2,657,374

UNITED STATES PATENT OFFICE 2,657,374

SUSPENSION SYSTEM FOR SEISMOGRAPH DETECTORS

Thomas Bardeen, Penn Township, Allegheny County, Pa., assignor to Gulf Research & Development Company, Pittsburgh, Pa., a corporation of Delaware Application November 2, 1949, Serial No. 125,023

18 Claims. (Cl. 340—17)

This invention relates to seismograph detectors and the employment thereof.

An object of the invention is to provide a novel form of seismograph detector wherein the mass of the moving system is suspended in a new manner, so that the detector is characterized by the attainment of a very long natural period corresponding to a frequency on the order of about five to fifty cycles per second.

Another object of the invention is to provide an improved seismograph detector, the moving system of which is resiliently suspended, and in which magnetic means are utilized to neutralize a large portion of the spring stiffness, with the attainment of very long natural periods of vibration in the suspended system.

A further object of the invention is to provide an improved seismograph detector having a low natural frequency, incorporating a suspension construction arranged to confine motion to one direction, and yet which is sufficiently rugged to withstand severe shocks incident to seismograph exploration.

Still another object of the invention is to provide an improved seismograph detector in which ferro-magnetic materials are attached to the moving system, while the fixed part is magnetic, and, by proper shaping of the magnetic field between the moving mass and the fixed part, lines of force or flux are created which act on the moving system, the natural frequency and sensitivity being adjustable by varying the dimensions of the elements so as to affect the lines of flux.

Another object of the invention is to eliminate or cancel the sag or initial deflection of the suspensions, and to provide a new detector in which the arrangement of parts is such that motion will never allow the fixed and movable magnetic parts to strike one another.

A further object of the invention is to provide a novel and improved form of seismograph detector which is simple in design, relatively inexpensive to manufacture, readily adjustable to meet field requirements, and effective in operation.

Other objects and advantages of the invention will become apparent from the description of preferred embodiments thereof as illustrated in the accompanying drawings, and in which.

Figure 9a is a diagram useful in understanding our invention and Figure 9b is a graph of the magnetic force of a plunger placed at various positions along the axis of the diagram of Figure 9a; and Figure 10a is a diagram of a magnet structure having air gaps at both ends and Figure 10b is a graph of the magnetic force on a plunger located at various points along the axis of the diagram of Figure 10a.

A seismograph detector consists essentially of a mass suspended elastically with respect to the fixed part of the device, the latter usually forming the case of the detector. A suitable means for measuring the relative motion between the mass and the case is also provided. When the elastic suspension of the mass is free from friction so that it is undamped, and the mass is given a sudden deflection with respect to the case, the elastic systems are generally designed so that the mass will vibrate with simple harmonic motion at a frequency, called the natural frequency, which depends on the size of the mass, and the stiffness of the elastic suspension. In general, a single unit of a seismic detector is designed to be responsive to only one mode of displacement of the case; for example, a mass suspended vertically responds only to vertical movement of the case, so that it is necessary to incorporate in the elastic suspension a means of confining the movement of the mass to one degree of freedom. Thus, there are two essential functions of the elastic system:

(a) Provide a resilient support between the mass and the case.
(b) Provide restraining members to confine the motion of the mass to one degree of freedom.

With elastic suspensions previously used in detectors, it has been difficult to design and construct detectors with a low natural frequency which also have sufficient restraining members to confine the motion to one degree of freedom and which are sufficiently rugged to withstand the severe shocks to which such detectors are subjected when used in seismograph exploration. In addition, for vertical detectors, the type most commonly used for seismic exploration, there is an initial sag of the elastic system caused by the effect of gravity on the mass, which increases as the natural frequency is lowered according to the following formula (approximate):

$$\text{Sag} = \frac{10}{f^2} \text{ inches}$$

where $f$ is the natural frequency in cycles per second. For a low natural frequency, this sag can become quite serious and quite often changes with time as a result of aging of the elastic suspension, causing a permanent set of the suspension, and, consequently, a change in the behavior of the detector.

In the recording systems commonly used for seismic exploration, it is common practice to use the detector as a high-pass filter so that detectors of different natural frequencies are needed when it is desirable to change the characteristics of the high-pass filter. With the elastic suspensions previously used, it is difficult, if not impossible, to change the natural frequency of the detector, and consequently the high-pass filter characteristic, over a wide range, for example, to double or triple the natural frequency, without substituting a new suspension system. This generally involves the complete rebuilding of the detector.

The new elastic suspension system which is disclosed herein is an improvement over the commonly used suspensions in the following respects:
(a) In a low natural-frequency detector, a high natural-frequency mechanical elastic system is used. This allows a low natural-frequency detector to be made as rugged as a high-frequency detector. (b) The suspension system is designed so that no appreciable sag occurs in the mechanical suspension system. (c) A screw adjustment is provided so that the natural frequency of the detector can be changed over wide ranges without disturbing the moving system.

This new elastic system achieves the above-mentioned and other useful objects by utilizing the attractive and repelling forces which exist in a magnetic field. Ferro-magnetic materials are attached to the moving system, and these in conjunction with ferro-magnetic materials on the case create a magnetic field, and forces are set up, which by proper shaping of the magnetic field act on the moving system. Magnetic fields thus set up can be utilized in combination with the mechanical suspensions described herein to achieve the desired aim in the complete dynamic system.

In order to understand clearly the nature of the invention, and the best means for carrying it out, reference may now be had to the drawings, in which like numerals denote similar parts throughout the several views.

Figure 6:
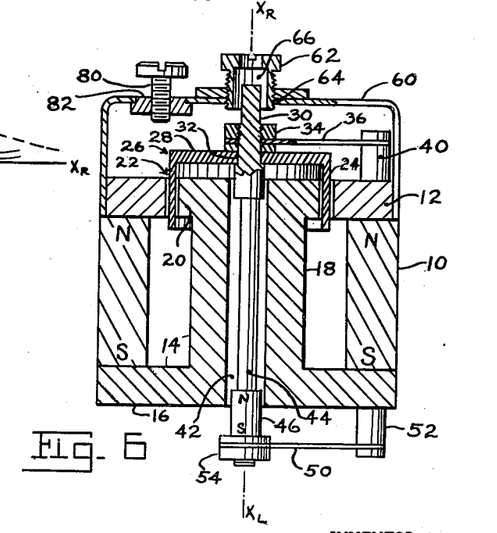
Figure 6 is a sectional elevational view of another form of the invention, with one moving coil.

Figure 6 illustrates a complete detector utilizing a magnetic force compensation. At 10 is an annular cylinder of longitudinally-magnetized permanent magnet material which is thus the source of magnetic flux in the device. A soft iron annular pole piece 12 is in contact with the N pole of the permanent magnet 10, and another soft iron pole piece 14 has its lower annular flange 16 in contact with the S pole of the permanent magnet. Throughout this specification the term soft iron is used to denote mild steel or any ferromagnetic material having a low or negligible magnetic retentivity. The central cylindrical body 18 of the pole piece 14 is provided with an integral upper annular collar 20 between which and the inner surface of the pole piece 12 is the annular recess 22 which constitutes the magnetic airgap.

The mass consists of a coil positioned in the magnetic airgap 22 to move in a vertical direction, that is, parallel to the axis of the cylinder 18. The coil itself is not shown in Figure 6, merely for simplicity of illustration, and is wound upon the depending cylindrical skirt 24 of the coil cup 26, which is open at its lower end, and is closed at its upper end by the integral disc 28. A soft ferro-magnetic plunger 30 extends through and is seated in an axial bore 32 in the disc 28, being retained therein by means of a nut 34 threaded thereon as shown, and also securing in position the inner end of a leaf spring 36 which is apertured to receive the plunger 30 and extends under the nut 34. The right hand end of the leaf spring 36 is secured to a bracket 40 which is fixed with relation to the permanent magnet 10.

The lower end portion of the plunger 30 extends partly into the axial bore 42 in the cylinder 18, and is secured to the upper end of a rod 44 which is movable axially in the bore 42 with the plunger 30. An auxiliary magnetic plunger 46 may be secured to the lower end portion of the connecting rod 44 so as to move therewith, this constituting a permanent or induced magnet with the lower end of the plunger 46 normally of the same magnetic polarity as the lower end of the main magnet 10. This provides a magnetic force compensation which may be of various types depending on whether the detector is used horizontally or vertically, as will be fully discussed later.

A second elastic suspension spring 50 similar to that shown at 36, is secured at its right hand end to the fixed bracket 52, with its inner end being secured to the lower portion of the plunger 46 by means of the nut 54 threaded onto the plunger. The cantilever beams 36 and 50 thus restrict the motion of the coil 24 to motion along the longitudinal or X axis, for small motions, such as are encountered in seismic exploration. For simplicity, it is assumed that the mechanical elastic suspensions behave as a simple spring in which the force acting on the coil is directly proportional to the displacement along the X axis, that is, parallel to the axis of the connecting rod 44, which is a very close approximation for small displacements.

Surrounding the airgap 22 of the magnet will be leakage flux. The portion of the leakage flux which passes through the plunger 30 causes a force to act on the plunger 30 which is in the direction to position it at a point along the X axis, this is, parallel to the axis of the cylinder 18, where the maximum leakage flux passes through the plunger 30. The values of this force for various positions of plunger 30 and for various lengths of the plunger are represented graphically as in Figure 8, for example.

Figure 8:
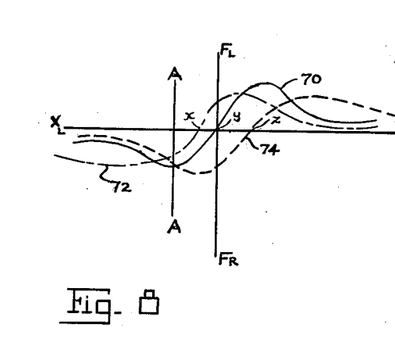
Figure 8 is a further graphical representation relating to the mode of operation and adjustment of the embodiment shown in Figure 6.

The curves of Fig. 8, which will be more fully explained later, are drawn with respect to the stable positions $x$, $y$, and $z$, of the plunger 30 when the device of Figure 6 is horizontal so that no gravitational force is acting along the axis of the plunger 30. The curves are drawn with the ordinates as the force, with a force tending to pull the plunger to the left given by $F_L$ and to the right by $F_R$. As will become apparent later, for small displacements of the mass along the X axis, the effect of the magnetic forces acting on the plunger can be chosen to have any rate of change of force from maximum positive to maximum negative slope of the curves by properly choosing the location along the X axis of the rest-position (zero displacement). If the plunger 30 is made of strong permanently-magnetized material such as "Alnico V" or "Cunife," the amplitude of the forces will be greater, and can also be considerably altered or even reversed.

A soft iron yoke 60 improves the magnetic circuit by increasing the leakage flux flowing through the plunger 30. An adjusting screw 62 of ferro-magnetic material is threaded into an opening 64 in the soft iron magnetic leakage yoke 60, with the upper end portion of the plunger 30 extending partially into the axial bore 66 formed in the screw 62. The plunger 30 will then have forces acting on it due to the leakage flux flowing through the plunger, which pull in the direction to move the plunger to a position along the X axis where the maximum flux flows through the plunger. The screw adjustment 62 allows the flux pattern to be altered so that either the force acting, or the rate of change along the X axis of the force acting on the plunger for a given position of the plunger on the X axis, or both, can be changed and adjusted to the desired values. The curves for plunger 46 at the other end of the detector would be similar to those of Fig. 8, but may differ in shape, strength or displacement according to the arrangement used.

Figures 9A, 9B, 10A, 10B:
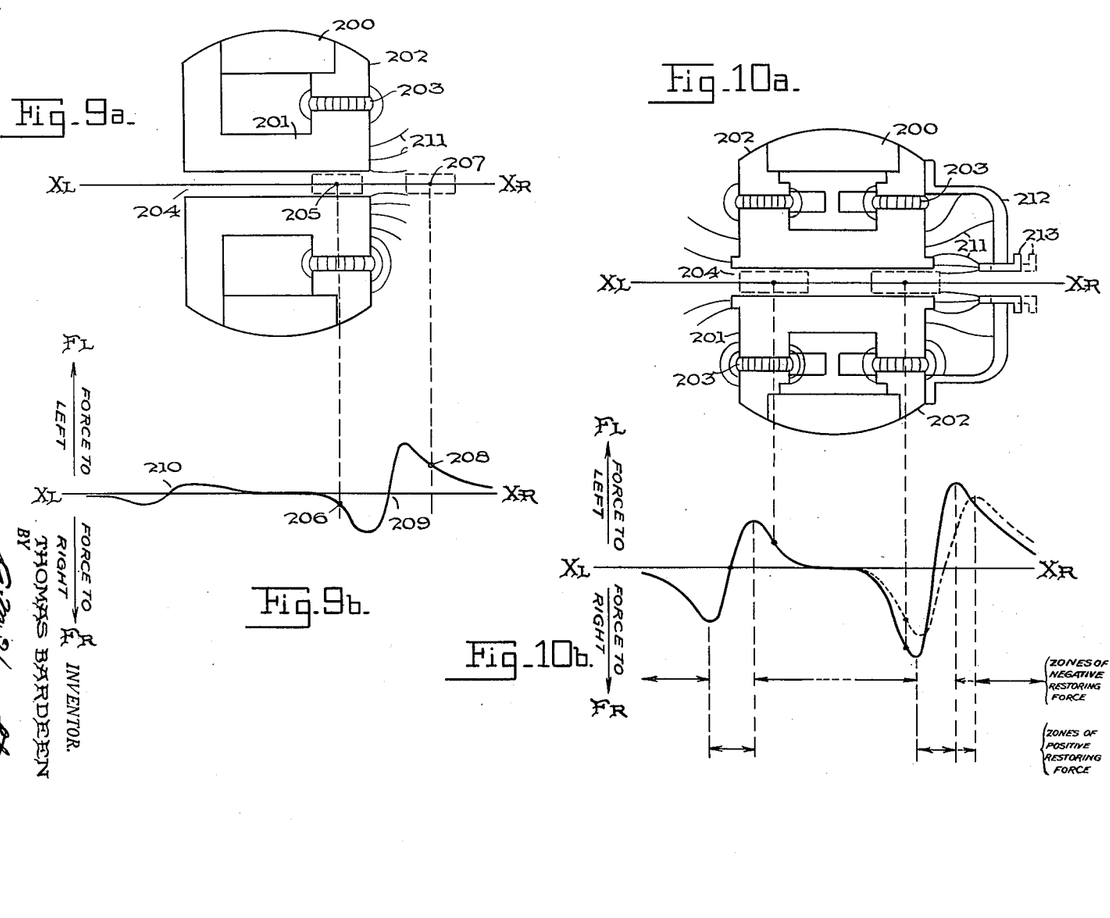

In order to obtain a better understanding of the magnetic forces employed by my invention, reference may be had to Figures 9a and 9b. Figure 9a is a diagram of the magnet structure of a seismograph detector similar to that shown in the drawing, Figure 6, described above. The magnet structure is annular in form as is the magnetic structure of Figure 6. The coil and various other mechanical parts have been omitted in Figure 9a in order to illustrate clearly how the magnetic plunger may be placed successively at various positions along the axis of the central passage in the structure so as to obtain the force vs. displacement characteristic of Fig. 9b.

The diagrams 9a and 9b represent annular magnetic structures in which 200 is a permanent magnet such as "Alnico." Pole pieces 201 and 202 of soft iron form the sides of annular air gap 203 in which the detector coil is suspended as previously described and completely shown in Figure 6. In accordance with my invention a hole or passage 204 is provided through the central core or pole piece in which the soft iron plunger 30 of Figure 6 may be guided and constrained for axial movement through the core without striking the magnetic structure as already described and shown in Figure 6. Such a plunger will manifest a varying force depending on its position along the axis and will also have a varying force vs. displacement characteristic (slope) depending on its position along the axis, and the desired characteristic can be imparted to the suspended coil and spring system by attaching the plunger to the coil as is shown in Figure 6. Figure 9b shows a qualitative plot of the magnetic force on the plunger for various positions along the $X_L$—$X_R$ axis. Figures 9a and 9b are drawn to the same horizontal scale and are aligned so that corresponding points on the $X_L$—$X_R$ axis are opposite one another.

For example, a plunger located as shown dotted at 205 of Figure 9a would experience a force 206 to the right as shown at the corresponding point on Figure 9b. The same plunger at 207 of Figure 9a would experience a force 208 to the left as plotted in Figure 9b. The curve of Figure 9b shows the plot of these forces for points along the axis $X_L$—$X_R$ of the diagram 9a. As the plunger starts to enter the core from the left it is at first attracted toward the core, but as it moves in further it is repelled from the core. Similarly as the plunger starts to leave the core at the right end it is at first repelled from the core but as it moves farther out it is attracted back toward the core. It is to be noted that the forces occur mainly in the regions where the plunger is just entering or leaving the core. At each end of the core there is an equilibrium position where there is no magnetic force as at 209 or 210 in Figure 9b.

Since for every point along the axis $X_L$—$X_R$ the magnetic force on the plunger varies with displacement from that point, the action of the magnetic forces is similar to that of a spring except that the value of the equivalent spring constant is different at different positions along the $X_L$—$X_R$ axis. The spring constant at point 209 for example is opposite in sense to that at points 206 and 208. At the force maximum, the spring constant is substantially zero. It is apparent therefore that because of the shape of the curve of Figure 9b it is possible at either end of the core to pick a position for the plunger so that it will experience a force in either direction, and furthermore the force gradient or spring constant may have either positive or negative or zero value.

The above-described magnetic forces on the plunger depend on the density and direction of flux emerging it. Flux lines for the magnetic structure are qualitatively shown at 211 as they are before the plunger emerges from the core. Since the flux lines are along the axis of motion, they first tend to pull the core out because they concentrate more flux at the outer end of the plunger when it is in a position such as 205. When the core is at 207, the flux is more concentrated at the inner end of the plunger, because much of the flux at the other end is spread over the sides of the plunger where it creates only balanced radial forces. Consequently, the net magnetic force when the plunger is at 207 is in the opposite sense from that when the plunger is at 205.

The character of the flux curves can be changed greatly as required for different applications by changing the shape of the magnetic members. For example, the curves will be broadened if a longer plunger is used. They will reach a maximum force value for a plunger of an optimum length. If the plunger is a permanent magnet, it will give a stronger force, and it may even reverse the force directions if it is magnetized opposite to the direction of the magnetism that would be induced in a similar soft-iron plunger. Figures 9a and 9b also show that the forces are stronger at an end of the magnet structure adjacent to an airgap, because the leakage flux is stronger where there is an airgap.

The diagrams of Figures 10a and 10b correspond to those of Figures 9a and 9b, except that they are drawn for a magnet structure with airgaps at both ends to accommodate two moving coils as in the device completely illustrated in Figures 1 to 5. Diagrams 10a and 10b also illustrate the effect of a yoke in increasing and adjusting the magnetic forces. The magnetic force on the plunger can be increased by adding a yoke 212 to deliberately increase the magnetic leakage field. If an adjustable hollow screw 213 of mild steel is provided, the curve of diagram 10b can be changed in strength and shape. Thus, if the screw 213 has the position of the solid lines in diagram 10a, the solid force graph of diagram 10b is obtained. If the screw 213 is moved out to the position of the dotted lines in diagram 10a, the dotted force graph of diagram 10b is obtained. Note that both the maximum force and the location of maximum force is changed. This illustrates the fact that a wide variety of adjustments may be made in designing the devices of Figure 1 or 6.

Returning again to Figures 6 and 8, there are plotted in Figure 8 three typical magnetic-force characteristics which may be utilized to obtain different instrument characteristics. Curve 70 shows the magnetic force acting on the plunger for the position of the screw adjustment shown in Figure 6 for screw 62. If the screw 62 is turned so that it moves to the right, that is, upward as seen in Figure 6, the magnetic force will be as shown by curve 74. If the screw 62 is turned so that it moves downwards as seen in Figure 6, the force will be as shown in curve 72. At a displacement position of the plunger, such as at A—A, for example, the value of the forces does not change to a large extent, since all the curves 70, 72, 74 cross the line A—A at about the same ordinate, but the rate of change of the force changes from zero, curve 70, to negative, curve 74, to positive, curve 72. On the other hand, at the position of line $F_L$—$F_R$ the rate of change of force is positive and does not change to a large extent, but the value of the force changes from zero, curve 70, to negative, curve 74, to positive, curve 72. It is therefore possible to pick a position to get a magnetic force in either direction with a rate of change of magnetic force of either positive, negative or zero value. This offers many possibilities in the design and/or adjustment of the dynamic system.

It is obvious that the value of the leakage flux flowing through the plunger 30 in Figure 6 is dependent upon the amount of flux flowing through the yoke 60. This flux can be changed by introducing a magnetic gap in the yoke 60 as shown, made variable by means of the screw 80. Portion 82 of the yoke is made of non-magnetic material and the screw 80 is of magnetic material. By turning the screw 80 so that it moves downwards, the effective magnetic gap in the yoke is reduced and the flux through the yoke is increased. By means of this adjustment the flux in the yoke 60 can be adjusted so that at the point A—A of the plunger as represented in Figure 8, the value of the forces on curves 70, 72 and 74 can be made nearly identical. The above discussion applies when the axis $X_L$—$X_R$ of Figure 6 is horizontal.

Figure 7:
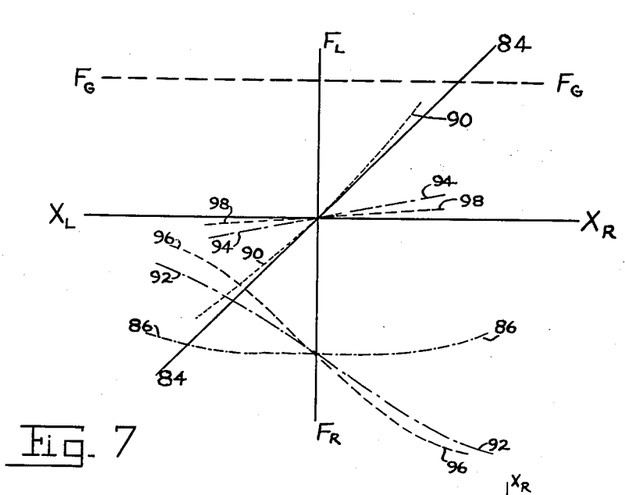
Figure 7 is a graphical representation relating to the mode of operation of the embodiment shown in Figure 6.

Referring again to Figure 6, it may be considered that the axis $X_L$—$X_R$ is vertical with $X_R$ up. The force of gravity will be constant and equal to $F_G$. Figure 7 shows the forces acting on the coil for various displacements along the X axis. Curve 84—84 represents the mechanical spring force. $F_G$—$F_G$ is the force of gravity, which is constant. Consider first the curve 86—86 which is a magnified portion of the curve 70 of Figure 8 near line A—A, adjustments having been made so that line A—A of Figure 8 coincides with the mechanical elastic-system zero of Figure 7 by adjusting the magnetic-force-adjusting screws 62 and 80. When the forces $F_G$—$F_G$, 84—84, and 86—86 (the static forces acting on the moving system) are combined, the net force is given by curve 90—90 indicated by the dots in Figure 7. It will be observed that the mechanical elastic system has no displacement from zero force (i. e., no sag) in the equilibrium position and that the slope of the force vs. displacement curve is the same for displacements as with the mechanical elastic system alone. The natural frequency of the detector is proportional to:

$$\left(\frac{\text{Slope}}{\text{Mass}}\right)^{\frac{1}{2}} \quad (I)$$

and thus will be the same as a detector without the magnetic force compensation.

A different screw adjustment of the screws 62 and 80 in Figure 6 will give a magnetic force vs. displacement curve similar to curve 74 in Figure 8 and again the position A—A will be the mechanical elastic system zero. This adjustment of the magnetic force compensation can be made to give curve 92—92 of Figure 7 which is curve 74 of Figure 8 magnified. When the forces $F_G$—$F_G$, 84—84, and 92—92 of the views are combined, the net restoring force is curve 94—94. The slope of this curve about the equilibrium position is about ¼ that of curve 90—90 so that the natural frequency of the detector (Formula I above) will be ½ that of the detector with the first adjustment discussed above.

A slightly different adjustment of the screws in Figure 6 can be made to give still a different magnetic force vs. displacement curve. With this magnetic force curve, the net restoring force may, for example, be made similar to curve 98—98. This curve has approximately ⅑ the slope on curve 90—90 about the equilibrium position and hence the natural frequency of the detector will be ⅓ that of the first adjustment described above. This adjustment gives a detector which has the mechanical stability of a detector with a natural frequency 3 times greater than its actual value, and achieves a detector of low natural frequency having the mechanical stability of a detector of high natural frequency.

The discussion above shows that for a vertically-oriented detector it is generally desirable to provide a fixed force to counteract the gravitational sag, plus a variable force to counteract a major part of the stiffness of the suspension spring. In horizontally-oriented detectors the gravitational deflection or sag does not occur and it is therefore only necessary to counteract the stiffness of the spring. However, a study of Fig. 8 will show that with a single magnetic plunger such as 30 in Fig. 6 it is not possible to counteract the stiffness of the suspension without also introducing a deflecting force. This is true because on curve 70 (Figure 8), for example, $y$ is the only point of zero deflecting force. The slope of the curve is positive at this point and therefore the magnetic forces add to the stiffness of the suspension. To get the desired negative slope it is necessary to operate to the right of the positive peak or to the left of the negative peak of curve 70. The resulting deflecting force can be overcome by providing a second magnetic plunger such as 46 (Figure 6) so adjusted that it will provide an approximately equal and opposite force. It may be adjusted to be also on a point of negative slope so that it will also subtract from the stiffness of the suspension, or on a point of zero slope where it will merely counteract the displacement force without affecting the stiffness and frequency.

In the special case where a permanent-magnet plunger is used as mentioned previously the force curves may be altered considerably. When the permanent magnetization of the plunger opposes and predominates over the magnetism induced in it, a force of repulsion can be obtained when the plunger is well outside of the magnetic structure where an attraction would otherwise exist. This repulsion may be used to provide a lifting force to overcome the suspension sag, and by setting the plunger above or below the point of maximum repulsion a positive or negative spring-constant may be introduced to raise or lower the resultant natural frequency of the system, or the maximum point may be selected if a lift is desired without a change of frequency.

The means disclosed above for obtaining magnetic forces of certain characteristics have been illustrated using the magnetic structure of a single coil electrodynamic detector. An extension to a double coil, electrodynamic detector, using a magnetic structure similar to that of Figures 1, 2, 3, 4, and 5, may be made by using auxiliary magnetic circuits on both sides of the magnet. Magnetic forces similar to those described above can be set up at each end of the suspended system by a magnetic structure and a plunger in which the magnetic structure is attached to the case and the plunger to the elastically-suspended mass of the detector. The source of magnetism can be a permanent magnet or an electromagnet and can be either in the plunger or in the magnetic structure, or both.

Figure 1:
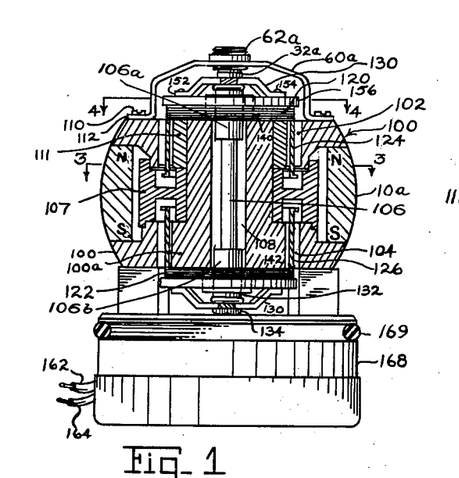
Figure 1 is a partly sectioned elevational view of one form of the invention, with two moving coils.

As seen in Figures 1 through 5, the detector may be made quite compact, having an over-all height as seen in Figure 1, of slightly less than four inches, not including the non-magnetic bell-shaped cover or cap, not shown, which serves to enclose the structure above the base. The diameter of the permanent ring-magnet 10a of Figure 1 may be made as small as 2⅝ inches, which demonstrates how small and compact this device may be made and yet function at high efficiency. The permanent ring-magnet 10a is disposed in a soft iron annular core 100, between the upper and lower annular portions thereof shown in the view. A central annular soft iron core 100a is disposed around the axis of the device as shown, and has an axial bore 108 for the reception of the connecting rod 106 which is similar to rod 44 of Figure 6. Connecting rod 106 may be made of soft iron shaped to have a relatively small-diameter middle portion with larger-diameter end portions 106a and 106b. Alternatively the middle portion 106 may be made of aluminum or other non-magnetic material with end pieces 106a and 106b attached as by a pressed fit. The end pieces 106a and 106b may be of soft iron or permanent-magnet material according to the characteristics desired to be obtained. The assembly of rod 106 and its end pieces 106a and 106b of Figure 1 corresponds to rod 44 with plungers 30 and 46 of Figure 6.

An annular divider member 107, made of aluminum alloy or other non-magnetic material, and roughly double-H-shaped when viewed in cross section as seen in Figure 1, is disposed in a recessed area of the central core 100a, and provides upper and lower seats for the annular outer cores 109 between which members the magnetic ring 10a is secured upon assembly. A ferrous filler ring 111 is seated above the inner flange of the dual spacer ring 107 and around the contiguous cylindrical outer surface of the central core 100a.

An upwardly open annular groove 102 is thus provided forming an upper airgap corresponding to the magnetic airgap 22 of Figure 6, across which opposite magnetic polarities produce magnetic flux. A similar downwardly open annular groove or recess 104 is formed opposite to the upper groove 102, thus presenting opposite magnetic polarities across this lower airgap which produce magnetic flux. A connecting rod 106 which corresponds to the connecting rod 44 of Figure 6 is movably disposed in the axial bore 108 of the core 100a. The shaft 106 may be made of soft iron or carry soft iron plungers at each end portion as mentioned above. The soft iron yoke 60a of Figures 1 and 2 corresponds to the yoke 60 of Figure 6, being secured in position to the core 100 by means of screws 110 extending through openings in its base fingers or flanges 112 and threaded into the core 100.

Figure 2:
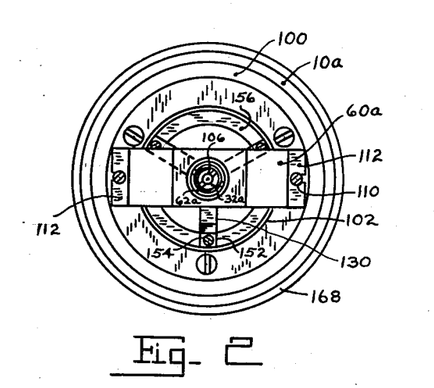
Figure 2 is a top plan view of the device shown in Figure 1.
Figure 3:
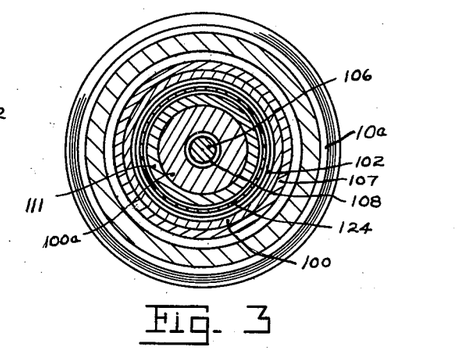
Figure 3 is a sectional plan view taken on plane 3—3 of Figure 1.
Figure 4:
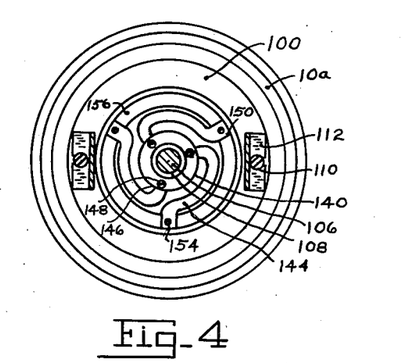
Figure 4 is a sectional plan view taken on plane 4—4 of Figure 1.

The axially bored screw 62a of Figures 1 and 2 corresponds to the screw 62 of Figure 6 and has its upper end slotted as shown in Fig. 2, for easy turning by means of a screw driver for adjustment as already described for Figure 6. The upper end of the plunger 32a which corresponds to plunger 30 of Figure 6 extends partly inside the axial bore in the screw 62a and for the same purpose. The embodiment of Figure 1 does not show the use of the screws 80 and non-magnetic portion of the yoke 82, but these are optional.

Figures 1 through 5 show two coils 120 and 122, which are wound on the skirts 124 and 126 of cups which correspond in function to cup 26 shown in Figure 6, except that there are two of them, one extending into the upper airgap, and the other extending into the lower airgap so as to bring their respective coils under the influence of these airgaps. Instead of the end disk 28, of Figure 6, these cups have open ends only partly closed by spiders 130 having three legs and formed of non-magnetic material. The spiders are secured at their hubs to the plungers 32a and 132 by means respectively, of the threading of the plunger 32a to make it serve also as a retaining nut, and by means of the nut 134.

The core 100a has upwardly and downwardly projecting annular posts 140 and 142 which are stationary relative to the core and through which the shaft 106 is movable axially. These posts may be made of magnetic or non-magnetic material as required to shape the leakage field for the desired characteristics. Leaf springs 144, shown best in Figure 4, have their inner ends 146 secured rigidly to the posts 140 and 142 respectively by means of screws 148 threaded into the posts 140 and 142. There are three such springs 144 for each post 140 and 142, and their outer ends 150 are secured, as seen best in Figure 4, beneath each of the three feet 152 of the spiders, by means of the screws 154 which are threaded into the rims 156 of the coil cups 124 and 126 respectively. It is seen then, that each of the coil cups and hence the coils carried wound thereon, is elastically and resiliently supported by the springs 144, from the posts 140 and 142 rigidly mounted on the core 100a.

Figure 5:
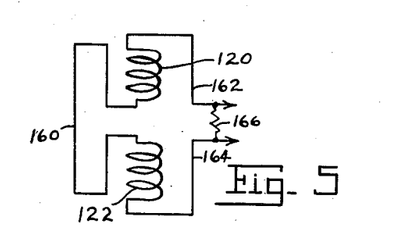
Figure 5 is a schematic circuit diagram of the interconnection of the movable coils with each other and with the external electrical elements.

Since the coil cups and hence the coils, are rigidly mounted on and movable with the shaft 106 and permanently spaced from each other, it is seen that the coils move together, and further, as seen in Figure 5, that they are interconnected in series-aiding arrangement by means of the wires 160, 162 and 164—that is to say, series aiding with respect to detector output. A damping resistor is connected as shown at 166, being mounted in the hollow base 168, the output wires 162 and 164 being in turn connectable to a suitable amplifier or other indicating means.

Due to the range of motion of the coils relative to the core, the connecting wires are relatively light and coiled in any manner well known in the art, such as pigtails, to avoid interference with free motion of the coils in the course of seismic exploration. The base 168 is made of non-magnetic material, and a bell-shaped hollow cap (not shown) also made of non-magnetic material and having a suspension eye at the top, may enclose the mechanism shown above the base 168, being frictionally engaged on its inner surface with the rubber sealing ring 169 carried in a suitable annular recess as shown. The whole device may thus be conveniently suspended from the eye in the cap. The cap is securely fastened to base 168 by screws not shown.

Although I have described my invention in specific terms, it will be understood that various changes may be made in size, shape, materials and arrangement without departing from the spirit and scope of the invention as claimed.

What I claim as my invention is:

1. A seismograph detector comprising a magnet, with an airgap forming a part of said magnet, a mass resiliently supported in said airgap, a coil carried by said mass and movable therewith in said gap, said coil being connectable to an external current-indicating means for registering motion thereof, a magnetic leakage yoke carried by said magnet and adapted to form a path for leakage flux thereof, and ferro-magnetic means movable with said mass and having a portion spaced from said yoke.

2. A seismograph detector comprising a magnet, with an airgap forming a part of said magnet, a mass resiliently supported in said airgap, a coil carried by said mass and movable therewith in said airgap, said coil being connectable to an external current-indicating means for registering motion thereof, a magnetic leakage yoke carried by said magnet and adapted to form a path for leakage flux thereof, said yoke being carried upon one pole of said magnet, ferro-magnetic means movable with said mass and having a portion spaced from said yoke, and adjustable means carried by said yoke and adapted to cooperate with said ferro-magnetic means for varying the mutual spacing therebetween, whereby the natural period of said detector may be adjusted.

3. A seismograph detector comprising a magnet, with an airgap forming a part of said magnet, a mass resiliently supported in said airgap, a coil carried by said mass and movable therewith in said airgap, said coil being connectable to an external circuit to register currents induced therein upon movement thereof through the magnetic flux of said airgap, a magnetic leakage yoke carried by said magnet and extending across the poles of said airgap, and ferro-magnetic means carried by and movable with said mass, said magnetic leakage yoke having an opening formed therein and adapted to lie in the path of said ferro-magnetic means.

4. A seismograph detector comprising a magnet, with an airgap forming a part of said magnet, a mass resiliently supported in said airgap, a coil carried by said mass and movable therewith in said airgap, said coil being connectable in an external circuit to register currents induced therein upon movement thereof through the magnetic flux of said airgap, a magnetic leakage yoke carried by said magnet upon one pole thereof and extending across the other pole of said airgap, ferro-magnetic means carried by and movable with said mass, said magnetic leakage yoke having an opening formed therein and adapted to lie in the path of said ferro-magnetic means, and means for varying the spacing between said opening in the magnetic leakage yoke and said ferro-magnetic means, whereby the natural period of said detector may be adjusted.

5. The construction according to claim 4, characterized further in that said ferro-magnetic means has an elongated portion adapted to enter the said opening in said magnetic leakage yoke.

6. The construction according to claim 4, characterized further in that said ferro-magnetic means has an elongated portion adapted to enter the said opening in said magnetic leakage yoke, and in which said yoke has ferro-magnetic means engaging said opening and adjustably adapted to extend from said opening in a direction to adjustably reduce the air path toward said elongated portion.

7. A seismograph detector comprising a magnet, with an airgap forming a part of said magnet, a mass resiliently supported in said airgap, a coil carried by said mass and movable therewith in said airgap, said coil being connectable in an external circuit to register currents induced therein upon movement thereof through the magnetic flux of the said airgap, a magnetic leakage yoke carried by said magnet upon one pole thereof and extending across the other pole of said airgap, ferro-magnetic means carried by and movable with said mass, said magnetic leakage yoke having an opening formed therein and adapted to lie in the path of said ferro-magnetic means, means for varying the spacing between said opening in the magnetic leakage yoke and said ferro-magnetic means, and means interposed in said magnetic leakage yoke for interrupting the continuity thereof and for providing a partial magnetic flux passageway upon said interruption, with means for regulating the flux accommodation of said partial passageway, whereby the natural period of said detector may be adjusted and regulated.

8. The construction according to claim 7, characterized further in that said yoke is formed of soft iron, with a portion thereof formed of non-magnetic material having an aperture formed therein, a screw threaded into said aperture and having its head formed of ferro-magnetic material and being of sufficient diameter to bridge across and interconnect the soft iron portions of said yoke which are spaced by said non-magnetic material, whereupon the degree of discontinuity of the flux path through said yoke may be regulated by adjusting the position of the head of said screw.

9. A seismograph detector comprising an annular magnet, a soft iron cylindrical core extending through said annular magnet and spaced therefrom, with an axial bore formed through said core, a lower flange formed integral with said cylindrical core and adapted to extend into contact with a first pole edge of said annular magnet, an upper flange formed integral with said cylindrical core and adapted to extend from an upper portion thereof outwardly to form a first face of a magnetic airgap, a second soft iron pole piece annular in shape and having a portion thereof disposed in contact with a second pole edge of said magnet of opposite polarity to said first pole edge, and having a surface of said second pole piece spaced from said first face of said magnetic airgap to form a second face thereof, a magnetic leakage yoke carried by said second pole piece and extending across said magnetic airgap to provide a path for leakage flux, and having an opening formed in said yoke, a mass resiliently supported in said airgap, a coil carried by and movable with said mass under the influence of external force, ferro-magnetic means carried by and movable with said mass and adapted to provide a partial path for leakage flux, the opening in said yoke being disposed in the path of and adapted to receive said ferro-magnetic means upon movement thereof, and means carried by said yoke and adjustable for regulating the distance between said ferro-magnetic means and said yoke, whereby the natural period of said detector may be adjusted.

10. The construction according to claim 9, wherein an axially bored ferro-magnetic screw is threaded into said yoke opening with its axial bore lying in the path of movement of said ferro-magnetic means, whereby the distance therebetween may be regulated upon turning said screw in said yoke opening.

11. The construction according to claim 9, characterized further in that said mass is secured to one portion of a resilient member another portion of which is secured in fixed relation to said magnet, to provide a resilient mounting for said mass.

12. The construction according to claim 9, characterized further in that said mass is carried upon a connecting rod extending movably through the said axial bore in said core, with a resilient supporting member having one end secured to each end of said connecting rod and having its other end secured in fixed relation to said magnet, to provide a resilient mounting for said mass with its motion limited and constrained to parallel the axis of said core.

13. A seismograph detector comprising an annular permanent magnet, a soft iron core adapted to receive said permanent magnet and having a first annular recess formed therein and constituting a first magnetic airgap and having a second annular recess formed therein and constituting a second magnetic airgap, said core having an axial bore formed therein, a connecting rod extending movably through said axial bore, a first coil carried upon one end portion of said connecting rod and wound upon a first mass, the first coil and mass extending movably into said first magnetic airgap, a second coil carried upon the opposite end portion of said connecting rod and wound upon a second mass, the second coil and mass extending movably into said second magnetic airgap, said coils being electrically interconnected and connectable to current-indicating means, a magnetic leakage yoke carried by said magnet and extending across the poles of an airgap, and ferro-magnetic means carried by said connecting rod and movable with said two coils and said connecting rod and having a portion spaced from said yoke.

14. A seismograph detector comprising an annular permanent magnet, a soft iron core adapted to receive said permanent magnet and having a first annular recess formed therein and constituting a first magnetic airgap and having a second annular recess formed therein and constituting a second magnetic airgap, said core having an axial bore formed therein, a connecting rod extending movably through said axial bore, a first coil carried upon one end portion of said connecting rod and wound upon a first mass, the first coil and mass extending movably into said first magnetic airgap, a second coil carried upon the opposite end portion of said connecting rod and wound upon a second mass, the second coil and mass extending movably into said second magnetic airgap, said coils being electrically interconnected and connectable to current-indicating means, a magnetic leakage yoke carried upon one pole of an airgap and extending across said airgap, ferro-magnetic means carried by said connecting rod and movable with said two coils and said connecting rod, with said adjusting means on said yoke lying in the path of said ferro-magnetic means, said adjusting means being adapted to enable adjustment of the spacing between said ferro-magnetic means and said yoke, whereby the natural period of said detector may be adjusted as desired.

15. The construction according to claim 14, in which permanent magnet means is also carried by said connecting rod, being magnetically oriented similarly to that of said main permanent magnet.

16. A horizontal seismometer comprising a magnetic structure, a mass, a spring suspending said mass from said magnetic structure, two magnetic plungers attached to said mass and arranged to move in and out of openings at opposite ends of said structure, said plungers being positioned so that they apply approximately equal forces in opposite senses to the spring suspension and the sum of their forces changes with displacement in a sense opposite to the spring constant of the spring suspension.

17. In a vertical seismometer of the type having an annular magnetic structure with an external leakage field and having an annular air gap, a mass movable with respect thereto and carrying a coil in the air gap, and a spring suspension for the mass, the improvement which comprises an axial opening in the magnetic structure, a magnetic plunger adjacent said opening and partly in said external field and movable with said mass, the plunger being positioned with respect to the external field at a point where its magnetic force opposes the gravitational force on the mass.

18. In a vertical seismometer of the type having an annular magnetic structure with an external leakage field and having an annular air gap, a mass movable with respect thereto and carrying a coil in the air gap, and a spring suspension for the mass, the improvement which comprises an axial opening in the magnetic structure, a magnetic plunger adjacent said opening and partly in said external field and movable with said mass, the plunger being positioned with respect to the external field at a point where its magnetic force opposes both the gravitational force and the spring constant acting on the mass.

THOMAS BARDEEN.

References Cited in the file of this patent

UNITED STATES PATENTS

| Number | Name | Date |
|---|---|---|
| 1,920,818 | Verrall | Aug. 1, 1933 |
| 2,064,621 | McNairy | Dec. 15, 1936 |
| 2,303,413 | Washburn | Dec. 1, 1942 |
| 2,311,079 | Parr | Feb. 16, 1943 |
| 2,348,225 | Petty | May 9, 1944 |

FOREIGN PATENTS

| Number | Country | Date |
|---|---|---|
| 245,805 | Great Britain | Jan. 20, 1927 |

OTHER REFERENCES

Magnets, Underhill, pp. 61, 77, 78, published 1924 by McGraw-Hill Co.